United States Patent
Öberg et al.

(10) Patent No.: US 9,730,267 B2
(45) Date of Patent: Aug. 8, 2017

(54) METHODS AND DEVICES FOR RADIO BEARER RELEASE

(75) Inventors: Magnus Öberg, Borensberg (SE); Peter Östrup, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/381,808

(22) PCT Filed: Mar. 14, 2012

(86) PCT No.: PCT/SE2012/050282
§ 371 (c)(1),
(2), (4) Date: Aug. 28, 2014

(87) PCT Pub. No.: WO2013/137786
PCT Pub. Date: Sep. 19, 2013

(65) Prior Publication Data
US 2015/0029975 A1   Jan. 29, 2015

(51) Int. Cl.
*H04W 76/06* (2009.01)
*H04L 12/24* (2006.01)
(Continued)

(52) U.S. Cl.
CPC ......... *H04W 76/06* (2013.01); *H04L 41/0659* (2013.01); *H04W 24/02* (2013.01);
(Continued)

(58) Field of Classification Search
None
See application file for complete search history.

(56) References Cited

U.S. PATENT DOCUMENTS

2004/0258045 A1* 12/2004 Groves ............ H04L 29/06027
370/352
2005/0054298 A1  3/2005 Chen
(Continued)

FOREIGN PATENT DOCUMENTS

SE  WO 2009061242 A1 *  5/2009  .......... H04W 76/064
WO  WO 2009/061242     5/2009

OTHER PUBLICATIONS

3GPP, 3rd Generation Partnership Project; "Technical Specification Group Services and System Aspects; General Packet Radio Service (GPRS) enhancements for Evolved Universal Terrestrial Radio Access Network (E-UTRAN) access" Rel.8, published in 2007, http://www.qtc.jp/3GPP/Specs/23401-800.pd.*
(Continued)

*Primary Examiner* — Andrew Lai
*Assistant Examiner* — Jamaal Henson
(74) *Attorney, Agent, or Firm* — Baker Botts, LLP

(57) ABSTRACT

The disclosure relates to a method (30) for radio bearer release performed in a base station node (2) of a communication system (5). The base station node (2) provides one or more radio bearers to a user equipment (1), and the communication system (5) comprises a serving gateway (4). The method (30) comprises: receiving (31) an error message from the serving gateway (4), the error message indicating a faulty radio bearer; awaiting (32), for a delay time, additional error messages indicating faulty radio bearers; and releasing (33) the one or more radio bearers being indicated as faulty.

12 Claims, 3 Drawing Sheets

(51) Int. Cl.
*H04W 24/02* (2009.01)
*H04W 24/10* (2009.01)

(52) U.S. Cl.
CPC ......... *H04W 24/10* (2013.01); *H04W 76/064* (2013.01); *H04W 76/068* (2013.01)

(56) References Cited

U.S. PATENT DOCUMENTS

| | | | |
|---|---|---|---|
| 2008/0285471 A1* | 11/2008 | Tegeler | H04M 7/1245 370/250 |
| 2010/0061331 A1* | 3/2010 | Guo | H04W 76/068 370/329 |
| 2012/0189016 A1* | 7/2012 | Bakker | H04W 76/021 370/401 |

OTHER PUBLICATIONS

3rd Generation Partnership Project; "Technical Specification Group Services and System Aspects; General Packet Radio Service (GPRS) enhancements for Evolved Universal Terrestrial Radio Access Network (E-UTRAN) access" Rel.8, published in 2007, http://www.qtc.jp/3GPP/Specs/23401-800.pdf, hereinafter known as 3GPP.*

ETSI TS 129 281 v11.6.0 (Apr. 2013); Universal Mobile Telecommunications System (UMTS); LTE; General Packet Radio System (GPRS) Tunnelling Protocol User Plane (GTPv1-U) (3GPP TS 29.281 version 11.6.0 Release 11) Technical Specification (29 pgs), Apr. 2013.

Ericsson Proposal, IP-GTP-U Supervision (72 pgs), Jan. 4, 2012.

ETSI TS 136 413 v11.7.0 (Jul. 2014); LTE; Evolved Universal Terrestrial Radio Access Network (E-UTRAN); S1 Application Protocol (S1AP) (3GPP TS 36.413 version 11.7.0 Release 11) Technical Specification (280 pgs), Jul. 2014.

PCT Written Opinion of the International Searching Authority for International application No. PCT/SE2012/050282, Mar. 13, 2013.

PCT International Search Report for International application No. PCT/SE2012/050282, Mar. 13, 2013.

ETSI TS 136 413 V10.5.0; Technical Specification; LTE; Evolved Universal Terrestrial Radio Access Network (E-UTRAN); S1 Application Protocol (S1AP) (3GPP TS 36.413 version 10.5.0 Release 10), Mar. 2012.

European Patent Office extended European Search Report in Application No. 12871040.7-1857/2826328 PCT/SE2012050282, dated Oct. 23, 2015, 7 pages, Oct. 23, 2015.

* cited by examiner

METHODS AND DEVICES FOR RADIO BEARER RELEASE

PRIORITY

This nonprovisional application is a U.S. National Stage Filing under 35 U.S.C. §371of International Patent Application Serial No. PCT/SE2012/050282, filed March 14, 2012 and entitled "Methods and Devices for Radio Bearer Release."

TECHNICAL FIELD

The technology disclosed herein relates generally to the field of wireless communication systems, and in particular to radio bearer release within such wireless communication systems.

BACKGROUND

GPRS Tunneling Protocol (GTP), specified in 3GPP TS 36.413, is a group of IP-based communications protocols used to carry General Packet Radio Service (GPRS) within Global System for Mobile Communications (GSM), Universal Mobile Telecommunications Service (UMTS) and Long Term Evolution (LTE) networks. GTP can be decomposed into separate protocols, and GTP-U (GTP-User plane, specified in 3GPP TS 29.281) is one of these. GTP-U is used for carrying user data within the GPRS Core Network and between the Radio Access Network (RAN) and the core network.

As part of the GTP-U protocol, a GTP-U ERROR INDICATION message can be sent to notify a peer about faults on a specific bearer. The peer (the eNodeB) shall then upon reception of the error indication message initiate an E-RAB (E-UTRAN Radio Access Bearer) Release procedure.

FIG. 1 is a sequence diagram illustrating the above. A user equipment (UE) may have one or more links or bearers for enabling voice, video and/or data communication, e.g. Internet Protocol (IP) bearers. The UE is connected to the eNodeB (or eNB) over a wireless communication link. A serving gateway (S-GW) maintains data paths between the eNodeB and public data networks (PDN, not illustrated) and routes and forwards user data packets.

A Mobility Management Entity (MME) manages, inter alia, the access to network connections for the UE, the assignment of network resources, and mobility states to support paging, roaming and handovers. The MME controls all control plane functions related to subscriber and session management. The MME may manage thousands of eNodeBs.

If the serving gateway detects a fault on a specific bearer, it sends (arrow 1) an error message to the eNodeB. The eNodeB then initiates (arrow 2) the E-RAB release procedure for releasing the bearer. The E-RAB release procedure ends with a S1-AP ERAB RELEASE INDICATION message, that is sent (arrow 3*b*) to the MME, and also (arrow 3*a*) a user equipment context release message that is sent to the UE.

SUMMARY

In case a partial or full reset in the serving gateway is needed, it is likely that many faults are detected simultaneously and as a result a burst of error indications are received in the eNodeB. If the eNodeB has many UEs attached, the number or error indications may be large. The inventors of the present disclosure have identified two kinds of problems that this may cause.

The S1-AP ERAB RELEASE INDICATION message comprises a list of released E-RABs but in case each GTP-U error indication is handled one at a time, each bearer release will cause a signal to the MME. Handling the burst of GTP-U error indications will cause a burst of S1-AP ERAB RELEASE INDICATION messages to be sent to the MME, which might cause high load on the MME.

Further, handling lots of E-RAB Releases and/or UE context releases (which is sent to the UE when the last E-RAB is to be released) might cause a high load on the eNodeB, and in particular on a processor thereof, handling the releases.

The problem of such bursts of messages between two nodes has been described above with reference to a communication system adopting the LTE standard, but corresponding problem may be encountered in other wireless communication systems, utilizing other communication protocols.

An object of the disclosure is to overcome or at least alleviate one or more of the above mentioned problems.

The object is, according to a first aspect, achieved by a method for radio bearer release performed in a base station node of a communication system. The base station node provides one or more radio bearers to a user equipment, and the communication system comprises a serving gateway. The method comprises receiving an error message from the serving gateway, the error message indicating a faulty radio bearer; awaiting, for a delay time, additional error messages indicating faulty radio bearers; and releasing the one or more radio bearers being indicated as faulty.

By introducing a delay before initiating release of the radio bearers, it is made possible to collect multiple error indicating messages. Fewer messages can then be sent to a mobility management node, reducing the load thereon. Further, if all radio bearer have been indicated as erroneous within the delay time, a user equipment context release request message may be sent.

In an embodiment, the awaiting a delay time comprises waiting a random time period. By randomizing the delay time, the radio bearer releases can be spread in time, which will distribute the load caused by performing many radio bearer releases.

In other embodiments, the awaiting a delay time comprises waiting a time period set based on a predetermined period of time and/or traffic load of the base station node, and/or based on processor capacity of the mobility management node and/or a load state of a mobility management node, and/or based on number of delay timers started for other user equipment, and/or based on number of radio bearer releases initiated during a specified period of time. The time period may thus be set in view of various different criteria and particularly in view of the communication system in which the method is to be implemented.

In an embodiment, the releasing of one or more radio bearers comprises transmitting a radio bearer release message to the user equipment for releasing the one or more radio bearers indicated as faulty.

In an embodiment, the releasing of one or more radio bearers comprises transmitting, to a mobility management node of the communication system, a message indicating the one or more released radio bearers. Sending only a single message relating to several released radio bearers reduces the load on the mobility management node.

In an embodiment, the awaiting a delay time comprises determining if the user equipment is provided with multiple radio bearers and waiting, for a predetermined time period, to determine if further provided radio bearers are faulty.

In a variation of the above embodiment, if all radio bearers provided to the user equipment are determined to be faulty, the releasing of one or more radio bearers comprises transmitting a radio resource control connection release message to the user equipment and/or transmitting a user equipment context release request message to a mobility management node of the communication system.

The object is, according to a second aspect, achieved by a base station node of a communication system for radio bearer release. The base station node is configured to provide one or more radio bearers to a user equipment, and the communication system comprises a serving gateway. The base station node comprises a processor being configured to: receive an error message from the serving gateway, the error message indicating a faulty radio bearer; await, for a delay time, additional error messages indicating faulty radio bearers, and release the one or more radio bearers being indicated as faulty.

In an embodiment, the processor is configured to await a delay time set as a random time period.

In an embodiment, the processor is configured to await a delay time set to a time period based on a predetermined period of time and/or traffic load of the base station node, and/or based on processor capacity of the mobility management node and/or a load state of a mobility management node, and/or based on number of delay timers started fro other user equipment, and/or based on number of radio bearer releases initiated during a specified period of time.

In an embodiment, the processor is configured to perform a radio bearer release procedure by transmitting a bearer release message to the user equipment for releasing the one or more radio bearer indicated as faulty.

In an embodiment, the processor is configured to perform a radio bearer release procedure by transmitting to a mobility management node of the communication system, a message indicating the released radio bearer.

In an embodiment, the processor is configured to await a delay time by determining if the user equipment is provided with multiple radio bearers and configured to wait, for a predetermined time period, to determine if all provided radio bearers are faulty.

The object is, according to a third aspect, achieved by a computer program for a base station node for radio bearer release. The base station node provides one or more radio bearers to a user equipment, and the communication system comprises a serving gateway, and a mobility management node. The computer program comprises computer program code which, when run on a processor of the base station node, causes the processor to perform the steps of: receiving an error message from the serving gateway, the error message indicating a faulty radio bearer; awaiting, for a delay time, additional error messages indicating faulty radio bearers; and releasing the one or more radio bearers being indicated as faulty.

The object is, according to a fourth aspect, achieved by a computer program product comprising a computer program as above and a computer readable means on which the computer program is stored.

Further features and advantages of the various embodiments will become clear upon reading the following description and the accompanying drawings.

DETAILED DESCRIPTION OF EMBODIMENTS

Figure 1:
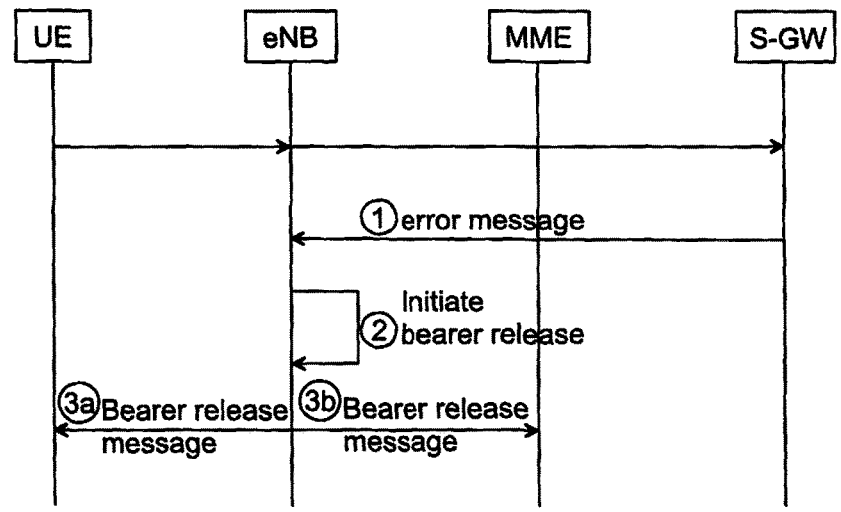
FIG. 1 is a sequence diagram illustrating messaging upon bearer faults within an LTE conforming system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
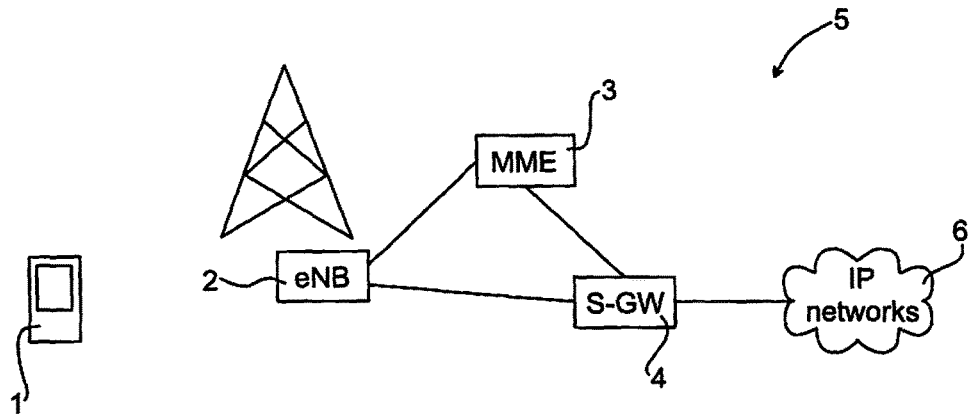
FIG. 2 illustrates schematically an environment in which various embodiments may be implemented.

FIG. 2 illustrates schematically an environment in which embodiments of the disclosure may be implemented. A communication system 5, e.g. conforming to LTE standard, comprises one or more devices with communication capability; such device (e.g. a wireless device) is in the description denoted user equipment (UE). The device may be any device adapted for communication, in particular wireless communication. The UE 1 is connected to a base station node 2, e.g. an eNodeB (also denoted eNB or evolved Node B) as illustrated in the FIG. 2, over a wireless communication link. It is noted that different communication systems use different terms for indicating a base station node; for example, in a communication system adopting the GSM standard, the term base transceiver station is commonly used, in yet other communication systems other terms are used.

The UE 1 may have one or more links or bearers for enabling voice, video and/or data communication, e.g. Internet Protocol (IP) bearers. Multiple bearers may be established for the UE 1 in order to provide different types of data streams or connectivity to different public data networks (PDN) 6, for example Internet Protocol (IP) networks as illustrated in the FIG. 2. The UE 1 might have a voice call link while at the same time browsing the web or downloading files, thus having several radio bearers established.

The communication system 5 further comprises serving gateway (S-GW) 4 that maintains data paths between the base station node 2 and one or more PDNs 6 and routes and forwards user data packets.

The communication system 5 further comprises a mobility management node 3, which in some communication systems is denoted Mobility Management Entity (MME). The mobility management node 3 typically manages, among other things, the access to network connections for the UE 1, the assignment of network resources, and mobility states to support paging, roaming and handovers. The mobility management node 3 controls all control plane functions related to subscriber and session management. The mobility management node 3 may manage hundreds or even thousands of base station nodes 2.

The mobility management node 3 may be part of a pool of mobility management nodes. For example, in LTE, an eNB can be connected to several MMEs of such a pool. Likewise, the serving gateway 4 may be part of a pool of serving gateways. The various embodiments described herein may be used in either case, i.e. whether or not the base station node 2 is connected to only one or several mobility management nodes 3.

Figure 3:
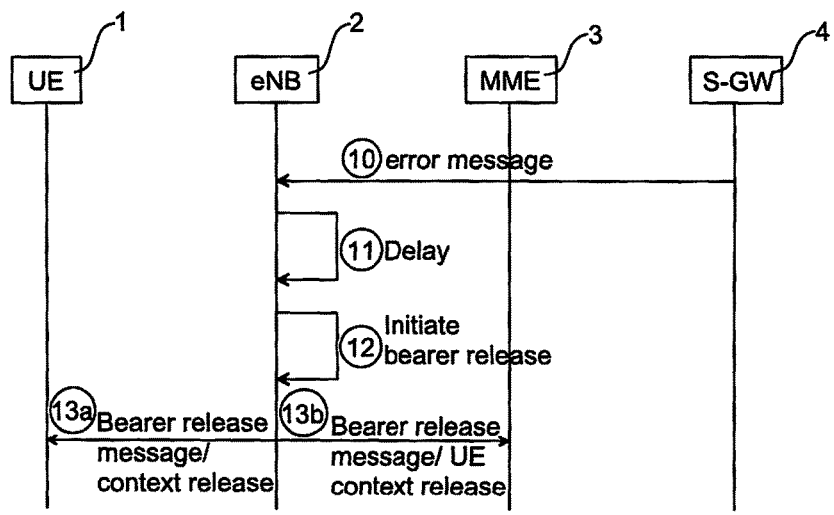
FIGS. 3 and 4 are sequence diagrams illustrating messaging upon bearer faults within a communication system.

FIG. 3 is a sequence diagram illustrating messaging upon bearer faults within a communication system. In the figure the communication system is partly exemplified by a communication system conforming to LTE standards in that the communicating nodes are denoted by vocabulary used in LTE.

A further notice on vocabulary is in order; the term "radio bearer" is used throughout the description, and is intended to encompass both radio bearers from the base station node 2 towards the UE 1 and also towards the mobility management node 3. A radio bearer between the UE 1 and the base station node 2 may also be denoted "radio access bearer".

For example, in the LTE standards (e.g. 3GPP TS 36.413, 3GPP TS 36.331, 3GPP TS 36.300, 3GPP TS 36.401) the following terminology is used:

LTE Uu Interface (Air Interface Between UE and eNB):
  Radio Bearer (RB) is one of the following:
  1) Data Radio Bearer (DRB): A bearer established between the eNb and the UE for user plane signaling.
  2) Signaling Radio Bearer (SRB): A bearer established between the eNb and the UE for control plane signaling (RRC and NAS).

A data radio bearer is released by the RRC Connection Reconfiguration procedure between the eNb and the UE (if there are data radio bearers left after the release—otherwise the RRC Connection Release procedure is used).

S1 Interface (Between eNB and Evolved Packet Core, e.g. the Serving Gateway):
  E-UTRAN Radio Access Bearer (E-RAB): A bearer established between the eNb and the MME, there is a one to one mapping between an E-RAB and a DRB.

An E-UTRAN Radio Access Bearer is released by the ERAB Release (-eNb initiated) procedure (if there are E-UTRAN Radio Access Bearers left after the release—otherwise the UE Context Release Request procedure is used).

Thus, when a "radio bearer" is released there will be one procedure to release the "radio bearer" on the respective interface (Uu and S1).

Reverting to FIG. 3, and in line with what was described in the background section, if the serving gateway 4 detects a fault on a specific radio bearer, it sends (arrow 10) an error message to the base station node 2 indicating the faulty radio bearer.

In accordance with an aspect, the base station node 2 then waits for a delay time (arrow 11), before it initiates (arrow 12) a radio bearer release, such as for example an E-RAB release procedure, for releasing the radio bearer. The bearer release may comprise sending (arrow 13a) a bearer release message and/or context release message to the UE 1, and sending (arrow 13b) a bearer release message and/or context release message to the mobility management node 3. For example, the E-RAB release procedure ends with a S1-AP ERAB RELEASE INDICATION message that is sent (compare arrow 13b) to the mobility management node 3, and also (compare arrow 13a) a user equipment context release message that is sent to the UE 1.

A burst of error message received from the serving gateway 4 would, in accordance with prior art, cause a burst of radio bearer release messages to be sent, thus possibly causing high load on both the mobility management node 3 receiving this burst of messages and the base station node 2 sending the burst of messages. By configuring the base station node 2 to wait for a delay time, to see if additional error messages for further radio bearers are received, such burst of messages can efficiently be avoided. That is, by introducing a delay time before initiating the radio bearer release, multiple error indications from the serving gateway 4 are collected and fewer radio bearer release messages are sent e.g. to the mobility management node 3. Further, the delay time will spread the handling (processing) of the received error messages over time and as such creating a more even load on the involved network nodes.

Further, if error messages have been received by the base station node 2 for all radio bearers of a certain UE 1 within the delay time, a UE context release request can be initiated directly with the concerned UE 1, instead of performing an individual radio bearer release for each radio bearer of the UE 1.

Figure 4:
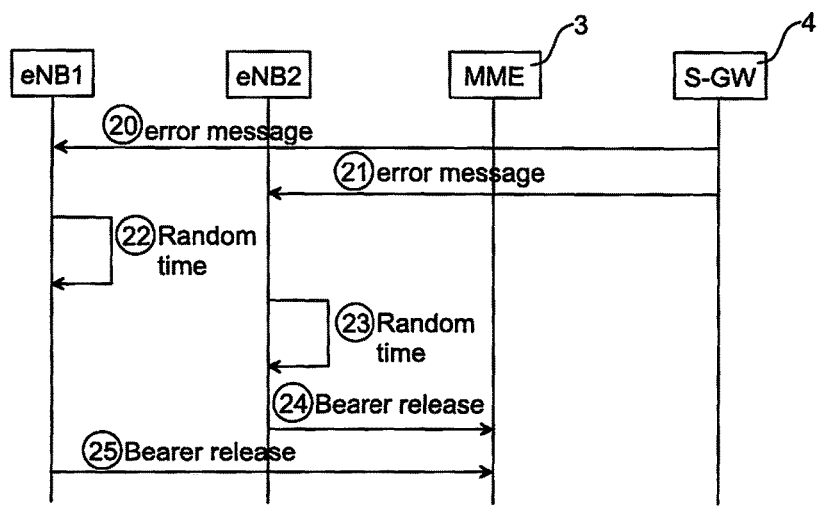

FIG. 4 is a sequence diagram illustrating messaging upon bearer faults within a communication system 5, in particular an LTE conforming communication system, in an aspect of the present disclosure.

In particular, if the serving gateway 4 has to be reset for some reason, it will send (arrows 20 and 21) bearer error indications to all base station nodes connected to it (in the FIG. 3 denoted eNB1 and eNB2). In this case, the error indications from the serving gateway 4 are triggered by that the serving gateway 4 receives uplink data from the base stations nodes on the radio bearers, which the serving gateway 4 no longer has knowledge about (due to the reset). The base station nodes would, in the prior art, in turn send radio bearer release messages to the mobility management node 3, which could be overloaded by the burst of messages to handle. In an aspect of the disclosure, the base station nodes are configured to wait a random time (arrows 22 and 23) before sending (arrows 24 and 25) the bearer release messages to the mobility management node 3.

This gives the mobility management node 3 more time to handle the messages from all the base station nodes since the messages are, in most cases, distributed better over time.

Figure 5:
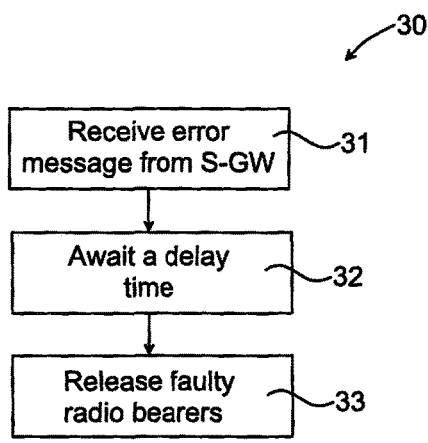
FIG. 5 is a flow chart of a method, performed in a base station node, according to an embodiment.

FIG. 5 is a flow chart of an embodiment of a method 30 performed in a base station node 2, such as the base station node 2 described above with reference to FIG. 4. The method 30 for radio bearer release is thus performed in a base station node 2 of a communication system. As already described, the base station node 2 provides one or more radio bearers to the user equipment 1, and the communication system 5 comprises a serving gateway 4. The method 30 comprises receiving 31 an error message from the serving gateway 4, the error message indicating a faulty radio bearer. In particular, the error message indicates a faulty radio bearer of a certain user equipment.

The method 30 further comprises awaiting 32, for a delay time, additional error messages indicating faulty radio bearers. Again, in particular indicating faulty radio bearers for the same certain user equipment.

The method 30 further comprises releasing 33 the one or more radio bearers that are indicated as faulty.

As mentioned earlier, by delaying the release of the radio bearers, the number of signals (amount of signaling) that are sent to the mobility management node 3 can be reduced and be better spread over time.

If all radio bearers are indicated as faulty within a short time period, i.e. if all radio bearers get error indications, a user equipment context release request can be initiated directly instead of performing multiple E-RAB releases.

In an embodiment, the awaiting 32 a delay time comprises waiting a random time period. By awaiting a random delay time, the load on the base station node 2 (particularly the load on the processor thereof) as well as the load on the mobility management node 3 (or processor thereof) can be distributed over time, avoiding the processors being very heavily loaded for time periods or even overloaded. The randomization may e.g. be accomplished by using a generator of random time delays, implemented in hardware or software or a combination.

The awaiting 32 a delay time may, in other embodiments, comprise waiting a time period set based on a predetermined period of time and/or traffic load of the base station node 2, and/or based on processor capacity of the mobility management node 3 and/or a load state of a mobility management node 3, and/or based on number of delay timers started for other user equipment, and/or based on number of radio bearer releases initiated during a specified period of time.

The operator of the communication system 5 may for example set the delay time based on the capacity of a processor of the serving gateway 4, and in particular in dependence on a part (e.g. a particular integrated circuit) of the serving gateway 4 that could be needing a reset more often than other parts. That is, the operator may configure the base station node 2, in particular a processing unit thereof, to have a certain delay time.

From the above, it is clear that the time period may be set in view of various different criteria and particularly in view of the communication system at hand and in which the method is to be implemented.

The awaiting 32 a delay time may comprise determining if the user equipment 1 is provided with multiple radio bearers and waiting, for a predetermined time period, to determine if further provided radio bearers are faulty. This is an optional step; in other embodiments no such active determination needs to be made and the base station node 2 is simply configured to wait the set time period before the radio bearers that are faulty are released.

If, in the above embodiment, a determination is made that all radio bearers that are provided to the user equipment 1 are faulty, then the radio bearers could be released immediately. That is, if the determination that all radio bearers are faulty is made before the delay time has elapsed then the radio bearers could be released immediately. The delay time during which the base station node 2 awaits could thus, in such embodiment, be seen as a maximum time period within which to wait.

The releasing 33 of one or more radio bearers may comprise transmitting a radio resource control connection release message to the user equipment 1 and/or transmitting a user equipment context release request message to a mobility management node 3 of the communication system 5.

The releasing 33 of one or more radio bearers may comprise transmitting a radio bearer release message to the user equipment 1 for releasing the one or more faulty radio bearers. In many communication systems, and in particular as defined in the protocols thereof, the release of a radio bearer comprises that the base station indicates to the user equipment 1 to release the faulty radio bearer. The user equipment thus releases the radio bearer which makes it available for use e.g. by other user equipment.

The releasing 33 of one or more radio bearers may also, or alternatively, comprise transmitting, to the mobility management node 3 of the communication system 5, a message indicating the one or more released radio bearers.

A radio bearer established by the user equipment 1 may be deemed faulty. In relation to GTP-U supervision, the bearer typically becomes faulty due to a fault in the serving gateway 4.

The releasing 33 of the one or more radio bearers may comprise indicating all faulty radio bearers by transmitting one message over an air interface towards the user equipment 1 and/or by transmitting one message over an interface towards a mobility management node 3 of the communication system 5. The use of a single message over a respective interface for releasing the radio bearers greatly reduces the signaling within the communication system 5.

In an aspect, a base station node 2 of a communication system 5 for radio bearer release is provided. The base station node 2 is configured to provide one or more radio bearers to a user equipment 1, and the communication system 5 comprises a serving gateway 4, such as already described.

Figure 6:
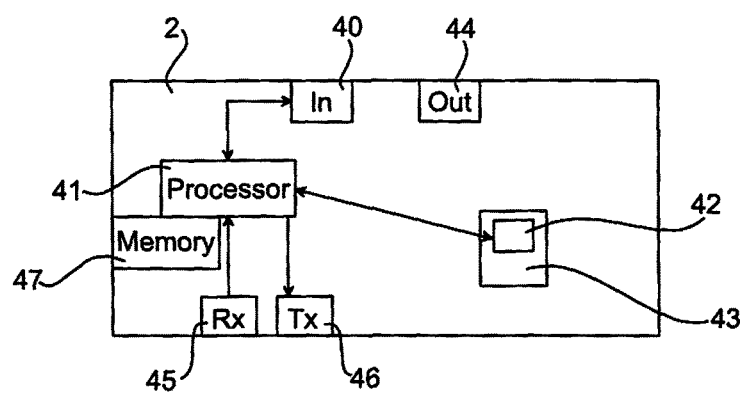
FIG. 6 illustrates an exemplifying base station node comprising means for implementing embodiments of the methods.

With reference to FIG. 6, the base station node 4 comprises an interface, typically for a wired connection, for the communication with the serving gateway 4, illustrated in the figure by an input unit 40 and output unit 44. Correspondingly, the base station node 4 comprises an interface for wireless communication with the user equipment 1. This interface is illustrated in the FIG. 6 by receiver unit 45 and transmitter unit 46. It is realized that these units are only schematically illustrated and that they may comprise a number of components, such as receive/transmit antennas, receiver/transmitter circuitry, signal processing units, analog-to-digital converters etc.

The base station node 2 further comprises a processing unit, in the following denoted processor 41. The processor 41 may e.g. be a single CPU (central processing unit), or could comprise two or more processing units in the base station node 2. The processor 41 may for example comprise general purpose microprocessors, instruction set processors and/or related chips sets and/or special purpose microprocessors, such as ASICs (application specific integrated circuits). The processor 41 may also comprise board memory for caching purposes.

The processor 41 may be configured to receive an error message from the serving gateway 4 (via input unit 40), the error message indicating a faulty radio bearer; to await, for a delay time, additional error messages indicating faulty radio bearers; and to release the one or more radio bearers being indicated as faulty.

The processor 41 may be configured to await a delay time set as a random time period. Such random time periods may be generated by a random signal generator. In other embodiment, the processor 41 may be configured to await a delay time set to a time period based on a predetermined period of time and/or traffic load of the base station node 2, and/or based on processor capacity of the mobility management node 3 and/or a load state of a mobility management node 3, and/or based on number of delay timers started for other user equipment, and/or based on number of radio bearer releases initiated during a specified period of time.

The processor 41 may be configured to perform a radio bearer release procedure by transmitting (via transmitter unit 46) a bearer release message to the user equipment 1 for releasing the one or more faulty radio bearer.

The processor 41 may be configured to perform a radio bearer release procedure by transmitting (via output unit 44) to a mobility management node 3 of the communication system 10, a message indicating the one or more released radio bearer.

The processor 41 may be configured to wait a delay time by determining if the user equipment 1 is provided with multiple radio bearers and configured to wait, for a predetermined time period, to determine if all provided radio bearers are faulty.

The processor 41 may be configured to release the one or more radio bearers by indicating all faulty radio bearers by transmitting one message over an interface towards the user equipment 1 and/or by transmitting one message over an interface towards a mobility management node 3 of the communication system 5.

The functions and actions as described performed by base station node 2, and in particular the processor 41 thereof, may be implemented in software, hardware or any combination thereof. The processor 41 may be configured to receive input from e.g. the input unit 40 and/or receiver unit 45, and perform functions as described based on such input.

The processor 41 may be embodied in the form of one or more microprocessors arranged to execute a computer program 42 downloaded to a suitable storage medium 43 associated with the microprocessor, such as a RAM, a Flash memory or a hard disk. The processor 41 may thus be arranged to at least partly carry out the method 30 according to various embodiments when the appropriate computer program 42 comprising computer-executable components is downloaded to the memory 47 and executed by the processor 41.

The disclosure also encompasses a computer program 42 for a base station node 2 for radio bearer release, the base station node 2 being one as described earlier. The computer program 42 comprises computer program code which, when run on a processor 41 of the base station node 2, causes the processor 41 to perform the steps of: receiving an error message from the serving gateway 4, the error message indicating a faulty radio bearer; awaiting, for a delay time, additional error messages indicating faulty radio bearers; and releasing the one or more radio bearers being indicated as faulty.

The computer program 42 may comprise further computer program code or separate computer program modules implementing the various embodiments.

The disclosure also encompasses a computer program product 43 comprising a computer program 42 as above and a computer readable means on which the computer program 42 is stored The computer program 42 may thus be carried by a computer program product 43 in the base station node 2, connected to the processor 41. The computer program product 43 comprises a computer readable medium on which the computer program 42 is stored. For example, the computer program product 43 may be a flash memory, a RAM (Random-access memory), ROM (Read-Only memory) or an EEPROM (Electrically Erasable Programmable ROM), an optical disc, such as a CD (compact disc) or a DVD (digital versatile disc) or a Blu-Ray disc, and the functions performed and described above could in alternative embodiments be distributed on different computer program products in the form of memories within the base station node 2.

It is noted that although aspects of the disclosure have been described with reference to specifically named messages, e.g. messages related to E-RAB procedure, or specific protocols, such as GPRS Tunneling Protocol (GTP), the teachings could be applied to other communication systems using other protocols, wherein the corresponding problem of excessive number of messages could be encountered.

The invention claimed is:

1. A method for radio bearer release performed in a base station node of a communication system, the base station node providing one or more radio bearers to a user equipment, the communication system comprising a serving gateway, the method comprising:

receiving an error message from the serving gateway, the error message indicating a faulty radio bearer, awaiting, for a delay time, additional error messages from the serving gateway indicating one or more other faulty radio bearers, wherein awaiting the delay time comprises waiting a random time period, and releasing the one or more radio bearers being indicated as faulty.

2. The method as claimed in claim 1, wherein the awaiting a delay time comprises waiting a time period set based on one or more of:
   a predetermined period of time;
   a traffic load of the base station node;
   a processor capacity of a mobility management node;
   a load state of the mobility management node;
   a number of delay timers started for other user equipment; and
   a number of radio bearer releases initiated during a specified period of time.

3. The method as claimed in claim 1, wherein the releasing of one or more radio bearers comprises transmitting a radio bearer release message to the user equipment for releasing the one or more radio bearers indicated as faulty.

4. The method as claimed in claim 1, wherein the releasing of one or more radio bearers comprises transmitting, to a mobility management node of the communication system, a message indicating the one or more released radio bearers.

5. The method as claimed in claim 1, wherein the awaiting a delay time comprises determining if the user equipment is provided with multiple radio bearers and waiting, for a predetermined time period, to determine if further provided radio bearers are indicated as faulty.

6. The method as claimed in claim 5, wherein, if all radio bearers provided to the user equipment are determined to be faulty, the releasing of one or more radio bearers comprises at least one of transmitting a radio resource control connection release message to the user equipment and transmitting a user equipment context release request message to a mobility management node of the communication system.

7. A base station node of a communication system for radio bearer release, the base station node being configured to provide one or more radio bearers to a user equipment, the communication system comprising a serving gateway, the base station node comprising a processor being configured to:
   receive an error message from the serving gateway, the error message indicating a faulty radio bearer,
   await, for a delay time, additional error messages from the serving gateway indicating one or more other faulty radio bearers, wherein the processor is configured to await a delay time set as a random time period, and
   release the one or more radio bearers being indicated as faulty.

8. The base station node as claimed in claim 7, wherein the processor is configured to await a delay time set to a time period based on one or more of:
   a predetermined period of time;
   a traffic load of the base station node;
   a processor capacity of a mobility management node;
   a load state of the mobility management node;
   a number of delay timers started for other user equipment; and
   a number of radio bearer releases initiated during a specified period of time.

9. The base station node as claimed in claim 7, wherein the processor is configured to perform a radio bearer release by transmitting a bearer release message to the user equipment for releasing the one or more radio bearer indicated as faulty.

10. The base station node as claimed in claim 7, wherein the processor is configured to perform a radio bearer release procedure by transmitting to a mobility management node of the communication system, a message indicating the released radio bearer.

11. The base station node as claimed in claim 7, wherein the processor is configured to await a delay time by determining if the user equipment is provided with multiple radio bearers and configured to wait, for a predetermined time period, to determine if all provided radio bearers are indicated as faulty.

12. A computer program product embodied on a non-transitory computer readable medium for use in a base station node for radio bearer release, the base station node providing one or more radio bearers to a user equipment, the communication system comprising a serving gateway, and a mobility management node, the computer program product comprising computer program code which when run on a processor of the base station node, causes the processor to perform the steps of:

receiving an error message from the serving gateway, the error message indicating a faulty radio bearer, awaiting for a delay time, additional error messages from the serving gateway indicating one or more other faulty radio bearers, wherein the awaiting the delay time comprises waiting a random time period, and releasing the one or more radio bearers being indicated as faulty.

* * * * *